A. OVERTREE.
AUTO TAIL AND LICENSE NUMBER LIGHT.
APPLICATION FILED MAY 12, 1920.

1,356,494.  Patented Oct. 19, 1920.

Inventor,
Augustus Overtree,
By Joseph A. Minturn
Attorney.

UNITED STATES PATENT OFFICE.

AUGUSTUS OVERTREE, OF INDIANAPOLIS, INDIANA, ASSIGNOR TO ILLUMINATED TAILLIGHT COMPANY, OF INDIANAPOLIS, INDIANA, A CORPORATION OF INDIANA.

AUTO TAIL AND LICENSE-NUMBER LIGHT.

1,356,494.  Specification of Letters Patent.  Patented Oct. 19, 1920.

Application filed May 12, 1920. Serial No. 380,718.

*To all whom it may concern:*

Be it known that I, AUGUSTUS OVERTREE, a citizen of the United States, residing at Indianapolis, in the county of Marion and State of Indiana, have invented new and useful Improvements in Auto Tail and License-Number Lights, of which the following is a specification.

The object of this invention is to provide a tail-lamp and license-plate holder that will conveniently receive and securely hold the plate and tail-lamp lens and utilize the light from the tail-lamp to vividly illuminate the license number.

The object, also, is to adjacently display a red-cross signal on doctors' cars as a notice to officers of the law that the owner is privileged to exceed the speed-limit.

I accomplish the above, and other objects which will hereinafter appear, by the mechanism illustrated in the accompanying drawing, in which—

Figure 1:
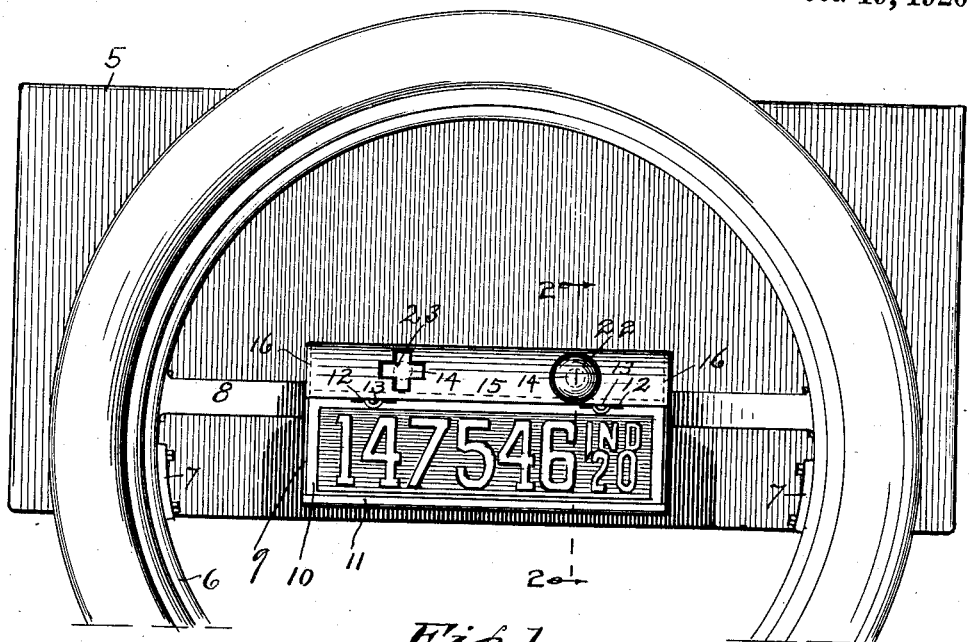
Figure 2:
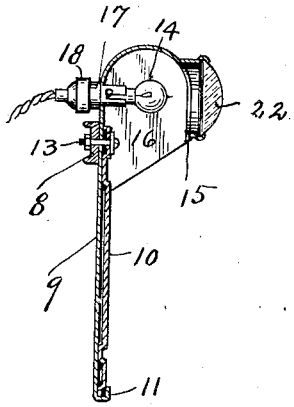
Figure 3:
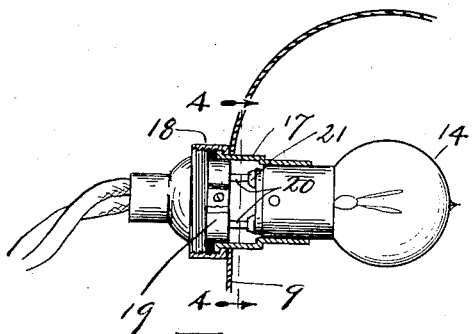
Figure 4:
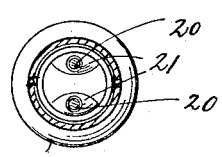

Figure 1, is a view in rear elevation of an automobile body with my invention operatively attached thereto. Fig. 2, is a vertical section on the line 2—2 of Fig. 1. Fig. 3, is a detail in section of the holder on a larger scale than is used for the preceding views, and Fig. 4, is a section on the line 4—4 of Fig. 3.

Like characters of reference indicate like parts throughout the several views of the drawing.

In the drawing, 5 is the rear end of a car-body to which a holder 6 for an extra tire is attached in the usual manner by brackets 7, 7, and in this case a horizontal bar 8 is supported by the holder 6, to which as in a majority of jobs in common use, the tail-lamp and license plate are attached. Other means of support may be used for my invention, the same as other means are used for supporting the tail-lamp and license plate in actual practice and it will be understood that the kind here shown is only given by way of illustration.

My invention comprises a metal plate, 9, as long or a little bit longer than the license plate 10, which it is designed to hold, with its lower edge loosely folded up at the front to form a flange-hook 11, in which the license-plate 10 is seated and supported. This plate 9 is provided with horizontal slots 12, 12, which register with those provided in the license-plate for the passage through them of fastening bolts; and fastening bolts 13, 13, are inserted through the slots in the plates 9 and 10 and also through holes in bar 8, whereby both of the plates are securely fastened to the bar.

The plate 9 is continued a suitable distance above the bar 8 and is bent forward in a half-circle of sufficient radius to provide room for lamps 14 between the plate 9 at the back and a parallel plate 15 in front of the lamps. The plate 15 is a continuation of the same sheet of metal from which the curved member and plate 9 are formed. It serves, with the curved member, in producing a reflector which arrests the rays of light and throws them down upon the license plate 10 to illuminate the latter and make the inscription which it bears legible at night. The ends of the curved member and of the plate 15 are connected with the plate 9 by end plates 16, 16, which strengthen the construction so that thinner lighter and cheaper metal may be used in the manufacture than would otherwise be practical. The end plates 16 also help to reflect the light against the license-plate, and, to still further increase this efficiency, the reflecting surfaces will be appropriately coated.

The lamp 14 has a metal sleeve 17 seated in the plate 9 which forms a socket in its front end for the lamp which is there retained by a bayonet-joint as shown, or by any of the usual means. The sleeve has a rotatable internally threaded sleeve 18 held by locking flanges as shown, which sleeve by receiving a threaded housing for insulation 19, draws the terminals 20, 20, carried by the latter into recesses in contacts 21, 21, on the lamp, whereby the lamp is locked against rotation and consequent removal until the terminal pins 20 are released by unscrewing the sleeve and withdrawing the pins from the contact sockets. This lamp-locking feature is one of the novel parts of my invention One or a plurality of lamps may be used. For general use one will be sufficient, placed in the middle of the reflector. I have here shown two because the device shown is one for a doctor's car where it is desired to display the customary tail-light and in addition thereto a Red-Cross insignia as a notice to officers of the law that the owner is licensed to exceed the speed limit to which the general public is restricted. In the case of either light an opening of the appropriate size and shape is formed in the front plate 15, and they are filled with red glass lens 22 for the accustomed tail-light and with plain red glass 23 for the Red Cross insignia.

Having thus fully described my invention, what I claim as new and wish to secure by Letters Patent of the United States is—

1. The combination with one or more lamps and a support, said support having bolts, of a holder-plate having a channeled lower edge in which a license plate is received and held, and bolt-slots registering with those of the license-plate whereby the two plates are secured to the support by said support bolts, said holder-plate having its top portion bent forward in substantially a semi-cylinder and continued downwardly parallel with the body of the holder-plate, and having light openings through it in front of one or more of the lamps.

2. The combination with one or more lamps and a support said support having bolts, of a holder-plate having a channeled lower edge in which a license plate is received and held and bolt-slots registering with those of the license plate whereby the two plates are secured to the support by said support bolts, said holder-plate having its top portion bent forward in substantially a semi-cylinder and continued downwardly parallel with the body of the holder-plate and having light openings through it in front of one or more of the lamps, and means at the outside and rear of the device for locking the lamps to prevent their frontal removal and for unlocking them.

3. As a new article of manufacture, a tail-lamp and license-plate holder comprising a first plate having means for holding the license-plate and an overhanging front top reflector, in combination with one or more lamps in the reflector supported by the first plate and means operated from the rear for locking the lamps against removal from the front and for unlocking them from the rear of the first plate to permit said removal from the front.

Signed at Indianapolis, Indiana, this the 5th day of May, 1920.

AUGUSTUS OVERTREE.